Patented Dec. 15, 1925.

1,565,496

UNITED STATES PATENT OFFICE.

CARL W. PFEIL, OF GREENBANK, WASHINGTON.

PROCESS FOR MAKING AND COMBINING CORRODE-RESISTING METALS.

No Drawing. Application filed September 20, 1922. Serial No. 589,464.

*To all whom it may concern:*

Be it known that I, CARL W. PFEIL, a citizen of the United States, residing at Greenbank, in the county of Island and State of Washington, have invented new and useful Processes for making and Combining Corrode-Resisting Metals, which compositions I have denominated aluminoid, of which the following is a specification.

My invention relates to treating a composite metal consisting of a base metal of fairly high melting point and having a metallic coating or alloy surface melting at a lower melting point with aluminum metal in a finely divided condition.

For example, I take a sheet of composite metal such as tin plate or galvanized iron or a lead-coated iron, and heat such sheet until the surface coating is beginning to melt, and then apply finely divided aluminum by mechanical means such as rolling, dipping or pressing until the sheets so treated will absorb no more. Thereafter, the mass is heated preferably to 900° F. In this process I prefer to first coat the sheet to be treated with a coating and flux mixture composed of some fatty substance, preferably palm oil, mixed with finely divided aluminum; and in most cases an aluminum powder, produced by grinding under air-excluding ingredients, is preferable. I have in some instance added to this flux such chemicals as ammonium chloride, boric acid, etc. In fact, the consistency of the ferrous metal to be treated will have to dictate what flux mixture may be necessary to acquire the best results for the different purpose for which the finished article is going to be used.

Some sheets treated by these processes receive only a coating, mostly depending on the condition of the metal to be treated; but in most instances the penetration is so deep that the whole structure of the different metals used has been rearranged into a uniform, combined mixture of the different metals without the malleability of the metals having suffered, but rather having been increased. The term "alloying with aluminum metal the outer surface of a composite metal" as used in the claims, is to be interpreted in view of the above remarks.

Where metals of higher melting point than aluminum are required, the processes vary, and in some instances an alloy has first to be made and this alloy powdered. But in all of the processes the aluminum must be in powdered form.

It is not absolutely clear to my mind how the apparent transposition of the different metals in this process takes place, but I have reason to believe that an electro-chemical action takes place and possibly an atomic energy created by the electrons that compose the atoms in the different metallic molecules are rearranging themselves, breaking up the ferrous as well as most of the other metallic molecules and crystals, rearranging the whole structure of the metals into a new, uniformly metallic structure of the whole.

After the aluminum mixture has reached the surface of the ferrous metal it starts to unite and penetrate into the baser metal.

It is a well known fact that in using aluminum in the treatment of ferrous metals, where the aluminum has to penetrate the surface of the iron or steel structure to form a corrode-resisting outer alloy, as in the calorizing processes, this layer is brittle and cannot therefore be used in the protection of metals in sheet form, or where the metals have to be malleable; but by using my processes this can be avoided.

The term aluminum metal is used to include metallic aluminum and alloys containing a predominating percentage of aluminum.

What I claim as my invention is:

1. A process of providing a corrode-resisting metallic combination for composite ferrous metals, which consists in heating a tin-coated ferrous metal until the tin melts and mixing finely divided aluminum with the molten tin until it can absorb no more.

2. A process of providing a corrode-resisting metallic combination for composite ferrous metals, which consists in heating a tin-coated ferrous metal until the tin melts and mixing finely divided aluminum with the molten tin until it can absorb no more, and increasing the heat until it reaches 900 degrees F.

3. A process of providing a corrode-resisting metallic combination for composite ferrous metals, which consists in coating a tin-coated metal with a coating and flux mixture consisting of finely divided aluminum mixed with a protective fatty material, heating the metal until the tin melts, applying more of the coating and flux-mixture and increasing the heat of the metal until it will absorb no more of the aluminum.

4. A process of providing a corrode-resisting metallic combination for composite ferrous metals, which consists in coating a tin-coated metal with a coating and flux mixture consisting of finely divided aluminum produced by powdering under an air-excluding substance and carrying the latter as a flux, then heating the metal until the tin melts, and applying more of the coating and flux mixture under increased heat until no more aluminum can be absorbed.

5. The process of alloying with aluminum metal the outer surface of a composite metal consisting of a base metal of high melting point carrying a metallic coating of low melting point comprising heating the composite metal until the metallic coating of low melting point begins to melt and then applying aluminum metal carrying an air-excluding agent.

6. The process of alloying with aluminum metal the outer surface of a composite metal consisting of a base metal of high melting point carrying a metallic coating of low melting point comprising heating the composite metal until the metallic coating of low melting point begins to melt and then applying aluminum metal ground in and carrying an air-excluding agent.

7. The process of alloying with aluminum metal the outer surface of a composite metal consisting of a base metal of high melting point carrying a metallic coating of low melting point comprising heating the composite metal until the metallic coating of low melting point begins to melt and then applying aluminum metal carrying an air-excluding agent and thereafter heating.

8. The process of alloying with aluminum metal the outer surface of a composite metal consisting of a base metal of high melting point carrying a metallic coating of low melting point comprising heating the composite metal until the metallic coating of low melting point begins to melt and then applying aluminum metal carrying an air-excluding agent and thereafter heating to 900° F

CARL W. PFEIL.